Dec. 14, 1971   J. PIETRYKA   3,626,746

WORK REDUCING AND SHAPING APPARATUS

Filed Feb. 25, 1969   5 Sheets-Sheet 2

INVENTOR
JOSEPH PIETRYKA

BY

AGENT

Dec. 14, 1971 — J. PIETRYKA — 3,626,746
WORK REDUCING AND SHAPING APPARATUS
Filed Feb. 25, 1969 — 5 Sheets-Sheet 3

INVENTOR
JOSEPH PIETRYKA
BY
AGENT

Dec. 14, 1971  J. PIETRYKA  3,626,746
WORK REDUCING AND SHAPING APPARATUS
Filed Feb. 25, 1969  5 Sheets-Sheet 4

INVENTOR.
JOSEPH PIETRYKA
BY
AGENT

INVENTOR.
JOSEPH PIETRYKA
AGENT

United States Patent Office 3,626,746
Patented Dec. 14, 1971

3,626,746
WORK REDUCING AND SHAPING APPARATUS
Joseph Pietryka, Paris, France, assignor to
Fives Lille-Cail, Paris, France
Filed Feb. 25, 1969, Ser. No. 802,089
Int. Cl. B21j 13/02
U.S. Cl. 72—402
10 Claims

ABSTRACT OF THE DISCLOSURE

A perimetric frame adapted for passing slender work such as a continuous casting therethrough. Blocks in the frame provide guide surfaces which are convergent in the direction of movement of the work. Work engaging shoes are slidable along the convergent guide surfaces so as to cross-sectionally reduce the work as it passes through the frame in step-by-step manner by reciprocation of the shoes. Wedges are slidably interposed between the frame and the blocks to move the shoes transversely into and out of engagement with the work.

---

This invention relates to new and useful improvements in apparatus for cross-sectionally reducing and shaping slender work, as for example, a continuous casting of a polygonal or a circular cross-section.

Conventional apparatus of this type usually embodies several sets of rollers or dies arranged in successive stages to sequentially engage and reduce the cross-section of the work. While this arrangement is generally satisfactory for its intended purpose, it has the disadvantage that the several sets of rollers or dies produce a substantial drag which hinders movement of the work. Moreover, the work moves at such slow speed that the rollers or dies become excessively heated and the work is subjected to rapid cooling.

Although some efforts have been made to cross-sectionally reduce the work in a single stage of operation, such efforts have resulted in an undesirable congestion of the work material at the signal reducing stage, thus again resulting in a hindrance to efficient movement of the work through the machine.

It is, therefore, the principal object of this invention to provide an improved apparatus which may be effectively employed to cross-sectionally reduce the work in a single stage operation without undesirable congestion of the work material.

Briefly, the apparatus of the invention comprises a perimetric frame through which the work passes, the frame containing at least one pair of opposing work engaging shoes which are slidable along convergent surfaces in the frame so that they engage the work in the direction of its movement and reduce the work in cross-section. The shoes are then slid back to their initial position for the next cycle of operation.

Other objects and features of the invention will become apparent from the following description taken in conjunction with the accompanying drawings, wherein like characters of reference are used to designate like parts, and wherein.

Figure 1:
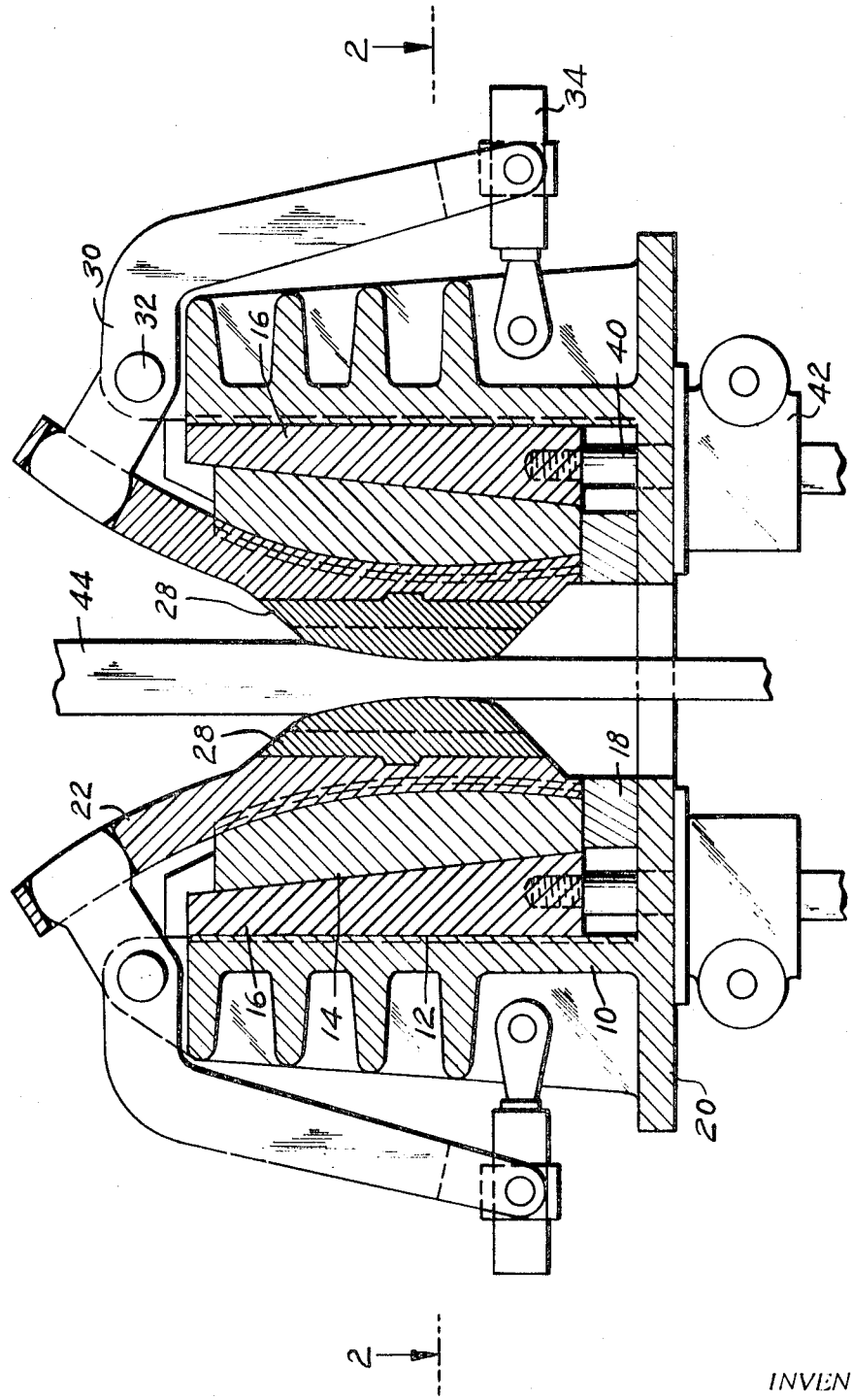
FIG. 1 is a sectional view of the apparatus of the invention, taken in a plane parallel to the direction of movement of the work.
Figure 2:
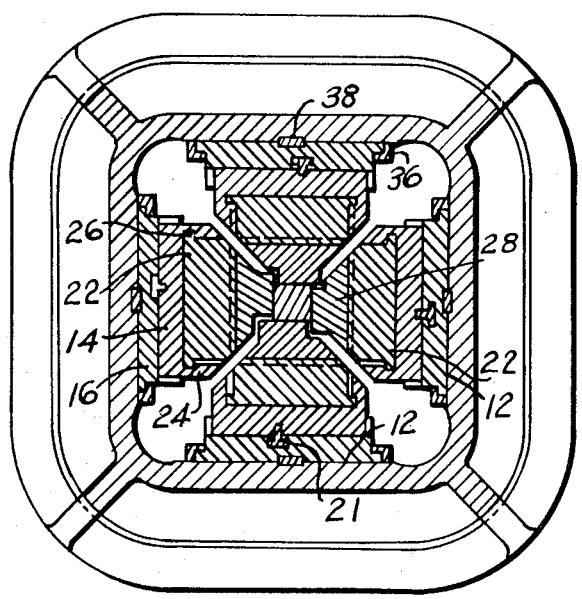
FIG. 2 is a cross-sectional view on a reduced scale, taken substantially in the plane of the line 2—2 of FIG. 1.
Figure 11:
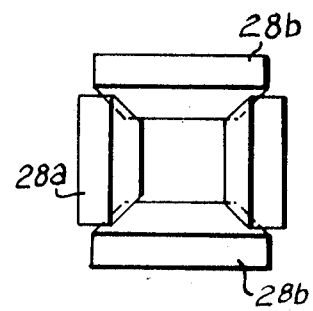
FIGS. 11-14 are schematic views showing different forms and arrangements of shoes which may be used in the apparatus.

Referring now to the accompanying drawings in detail, and more particularly to FIGS. 1 and 2, the apparatus of the invention comprises a perimetric frame 10 which is adapted to have a slender piece of work 44 passed therethrough, the work 44 being, for example, a continuous casting, which is to be cross-sectionally reduced and shaped by the apparatus of the invention.

The inside of the frame 10 is provided with two pairs of flat, opposing surfaces 12 which are parallel to the axis of the frame as represented by the work piece 44. The frame also contains two pairs of blocks 14 which rest on a base member 18 in the frame, and upwardly tapered wedges 16 are interposed between the blocks 14 and the surfaces 12 of the frame. The blocks 14 have convex opposing surfaces, the axes of which are disposed in a common plane transverse to the longitudinal axis of the frame.

T-shaped keys 21 carried by the blocks 14 are slidable in T-slots formed in the inclined surfaces of the wedges 16 as shown in FIG. 2, so that when the wedges 16 are moved upwardly or downwardly in the frame 10, the blocks 14 are caused to move respectively toward and away from the work piece 44. The wedges 16 are slidably mounted on the frame surfaces 12 by suitable guides 36 and keys 38.

Two pairs of work engaging shoes 22 are slidable longitudinally on the convex surfaces of the blocks 14, the side edges of the shoes having flanges 26 which are slidably received in guides 24 of the blocks, as shown in FIG. 2. The shoes 22 have rigidly secured thereto the actual work engaging shoe members 28 with convex work engaging faces which are concentric with the convex surfaces of the blocks 14. It will be noted that the arrangement is such that when the shoes 22 are slid downwardly on the blocks 14, the convergent relationship of the convex surfaces of the blocks will cause the shoes to move inwardly into engagement with the work 44 by the shoe members 28. Conversely, when the shoes are slid upwardly, the shoe members 28 will move outwardly and out of engagement with the work.

The shoes 22 are slid upwardly and downwardly along the blocks 14 by levers 30 which are pivoted to the frame 10 as at 32, these levers having short end portions which operatively engage the shoes 22 in the manner of a ball-and-socket. The long end portions of the levers are connected to hydraulic or screw jacks 34, the operation of which is synchronized so that the levers 30 cause the shoes 22 to slide simultaneously and in the same direction.

The wedges 16 are slid upwardly and downwardly in the frame 10 by means of screws 40 rotated by worm and gear drives 42 at the underside of the base 20 of the frame. Here again, the screw drives are synchronized so that the wedges are slid simultaneously and in the same direction.

When the apparatus is in operation, the levers 30 are actuated by the jacks 34 so that the shoes 22 move downwardly (as viewed in FIG. 1). This brings the shoe members 28 into engagement with the work 44, and as the work is moved downwardly by the shoes, it is also cross-sectionally reduced to a predetermined extent by the time the shoes reach the lower limit of their travel. At that point the shoes cannot be simply returned to their raised position because they would move the work back upwardly with them. Thus, before returning the shoes, it is necessary to move them laterally away from the work while they are still in their lowered position, and this is accomplished by actuating the screws 40 so that the wedges 16 are drawn downwardly, which causes the blocks 14 and the shoes 22 to move outwardly, out of contact with the work. With this accomplished, the shoes 22 are slid upwardly along the blocks 14 by the levers 30 and the wedges 16 are slid upwardly so as to again bring the shoe members 28 into engagement with the work, whereupon the apparatus is ready for the next cycle of operation. Thus, it will be seen that the work piece 44 is advanced in a step-by-step manner and is cross-sectionally reduced during each step of its movement.

The compression of the work is particularly pronounced at the lower end portions of the shoe members 28 and it is preferable for these portions to be polished and smooth in order to obtain a relatively low coefficient of friction. On the other hand, the upper end portions of the shoe members 28 may be relatively rough for a higher coefficient of friction, to assure a proper feeding movement of the work by the shoes.

It is to be also noted that the extent of cross-sectional reduction and consequently the resultant cross-section of the work may be varied within limits by appropriately coordinating the length of travel of the wedges 16 and of the shoes 22 relative to the blocks 14. Thus for example, if the wedges 16 are initially slid partly downwardly while the shoes 22 are fully raised, a full downward sliding movement of the shoes will not reduce the work as much as it would if the wedges had been fully raised at the start of the operation.

Figure 3:
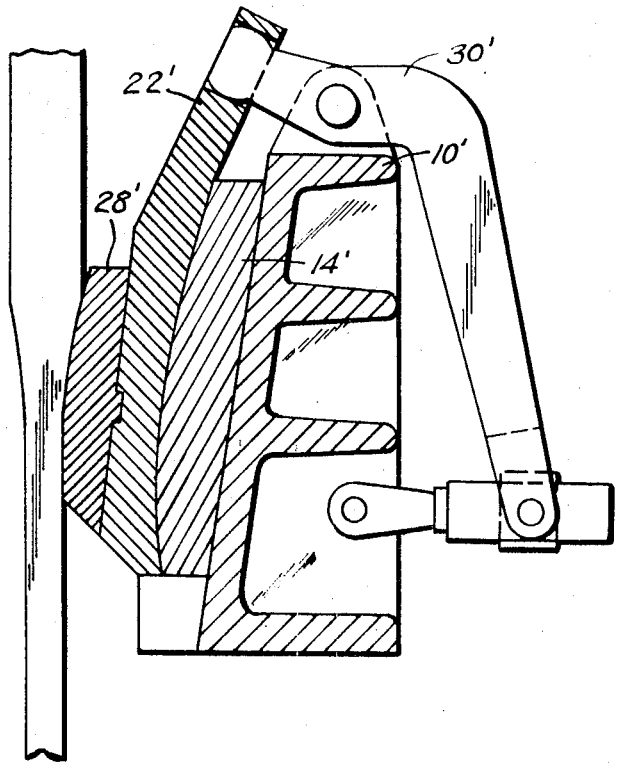
FIG. 3 is a fragmentary sectional view similar to FIG. 1 but showing a modified embodiment.

The modified embodiment of the invention shown in FIG. 3 is much the same as that already described, except that the blocks 14' are fixedly mounted in the frame 10' without adjustment facilities such as are provided by the aforementioned wedges 16 in the assembly of FIGS. 1 and 2. The shoes 22' are slidable on the blocks 14' by the levers 30' and the convex faces of the shoe members 28' and of the blocks 14' are arranged so that the shoes, after moving downwardly with and compressing the work, may be returned to their raised position without necessarily being retracted away from the work or tending to move the work back upwardly with them.

Figure 4:
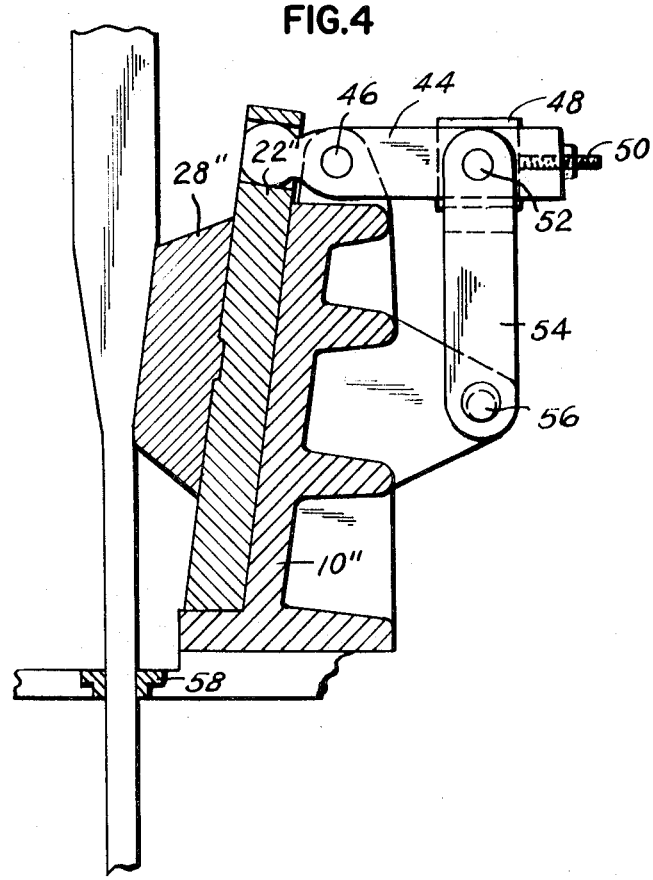
FIG. 4 is a fragmentary sectional view, similar to FIG. 1 but showing another modified embodiment.

A similar arrangement exists in the modified embodiment of FIG. 4, where the shoes 22" and the work engaging shoe members 28" have flat and parallel surfaces, complemental to surfaces of the frame 10", and mutually convergent in the direction of movement of the work. In this embodiment the shoes 22" are slidable directly on the frame 10" and the wedges 16 as well as the blocks 14 or 14' are eliminated.

The shoes 22" are slid upwardly and downwardly in the frame 10" by levers 44 which are pivoted to the frame as at 46. Each lever 44 has a slide block 48 adjustable longitudinally thereon by means of a screw 50. A link 54 is pivoted to the block 48 as at 52 and is actuated by a rotatable cam 56 on the frame 10". The cams of the four shoe units are synchronously driven so that the shoes 22" are slid upwardly and downwardly in the frame simultaneously. The amplitude of movement of the shoes may be varied by adjustment of the screw 50 which moves the slide block 48 along the lever 44 toward or away from the lever pivot 46.

Figure 5:
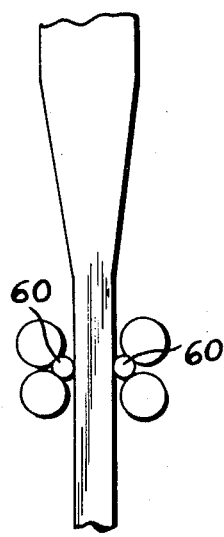
FIG. 5 is a schematic illustration of a work calibrator.

If it should be found, particularly in the embodiments of FIGS. 3 and 4, that the work reducing operation leaves the surface of the work somewhat unsmooth, a suitable sizing die or calibrator 58 may be provided below the frame of the machine as in FIG. 4. Such a calibrator may also employ sizing rollers 60, as shown schematically in FIG. 5.

Figure 8:
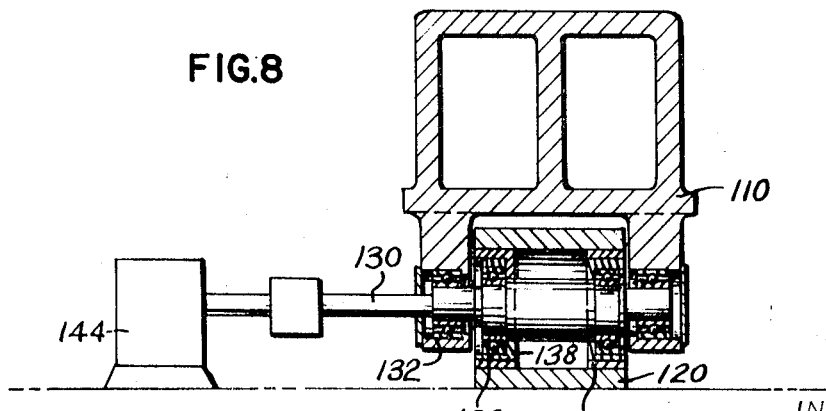
FIG. 8 is a sectional view taken substantially in the plane of the line 8—8 in FIG. 6.
Figure 6:
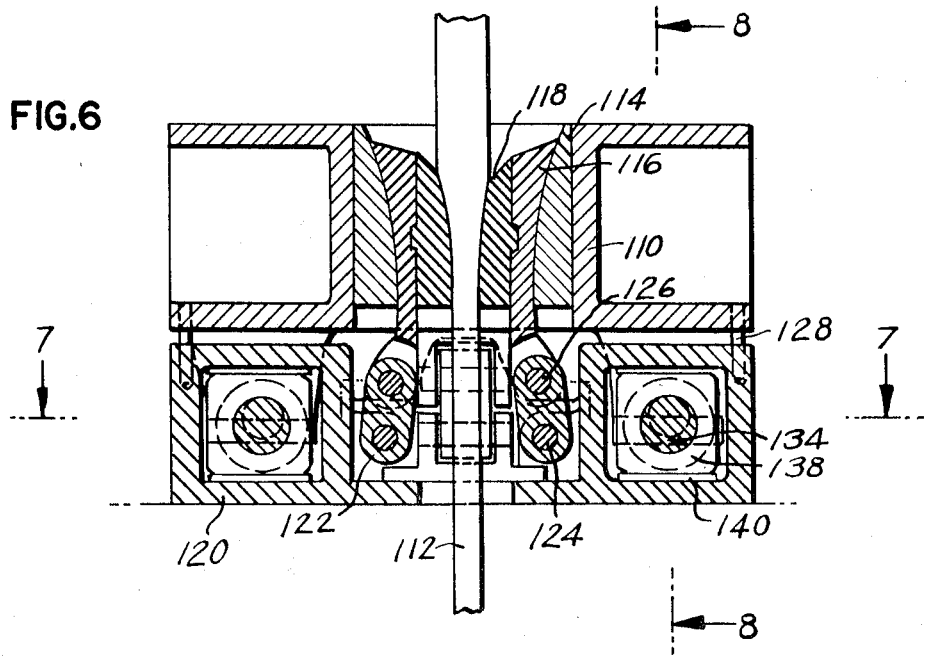
FIG. 6 is a sectional view similar to FIG. 1 but showing another modification taken on the plane of the line 6—6 in FIG. 7.
Figure 7:
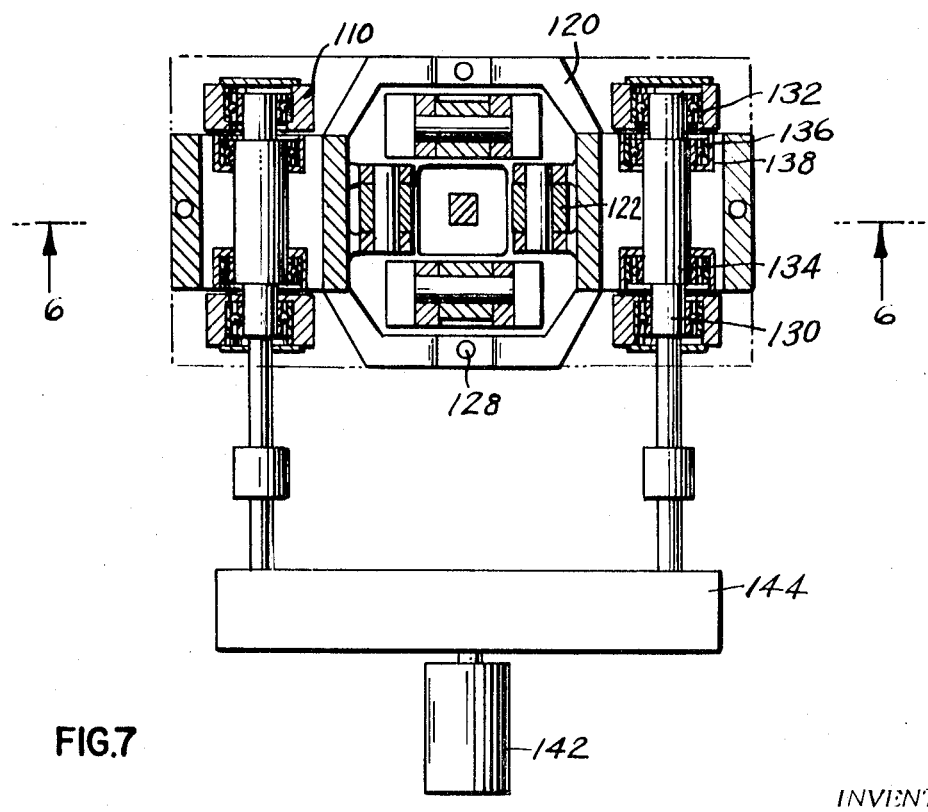
FIG. 7 is a sectional view taken substantially in the plane of the line 7—7 in FIG. 6.

FIGS. 6–8 illustrate another modified embodiment of the invention which utilizes a perimetric frame 110 for passage of the work 112 therethrough. Four blocks 114 are secured in the frame and shoes 116 are slidable longitudinally on convex surfaces of the blocks 114, the shoes having work engaging shoe members 118 secured thereto. The faces of the shoe members 118 are convex and concentric with the convexities of the blocks 114 on which the shoes 116 slide.

A perimetric platform or table 120 is juxtaposed axially or longitudinally to the frame 110 and is movable axially toward and away from the frame, its movement being guided by suitable pins 128. Lower end portions of the shoes 116 project into the table 120 and carry pivot pins 126 connected by links 122 to pivot pins 124 in the table. Thus, if the table 120 is moved upwardly toward the frame 110, the shoes 116 are slid upwardly along the blocks 114, and if the table is moved downwardly, a corresponding downward sliding of the shoes results.

Upward and downward reciprocating movement of the table 120 relative to the frame 110 is produced by eccentrics 134 operable within bearing blocks 138 which are contained within the table 120. The eccentrics 134 are provided on a pair of drive shafts 130 which are journalled in suitable bearings 132 at the underside of the frame 110 and are driven by a suitable motor 142 simultaneously through a suitable reduction drive 144. Antifriction bearings 136 may be provided for the eccentrics 134 in the blocks 138 and suitable guides 140 may be provided in the table 120 for sliding movement of the blocks 138 in the transverse direction under the action of the eccentrics.

Figure 10:
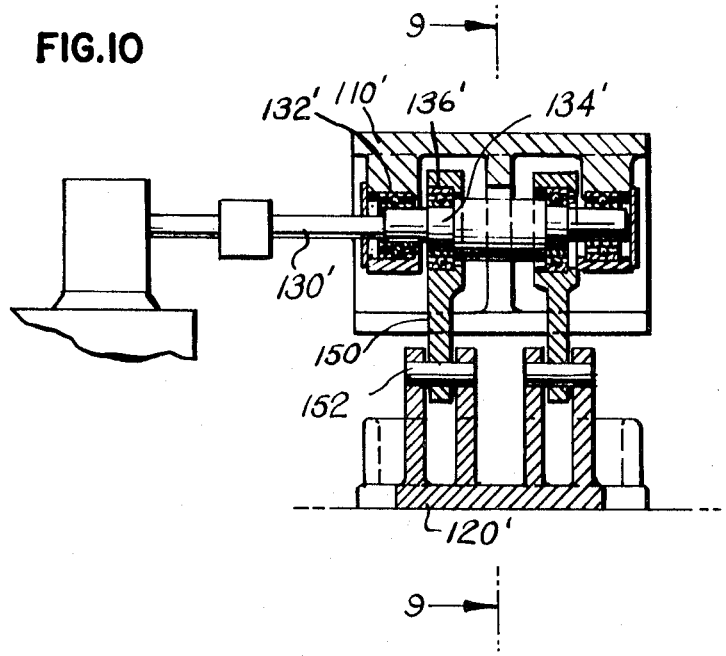
FIG. 10 is a sectional view taken substantially in the plane of the line 10—10 in FIG. 9.
Figure 9:
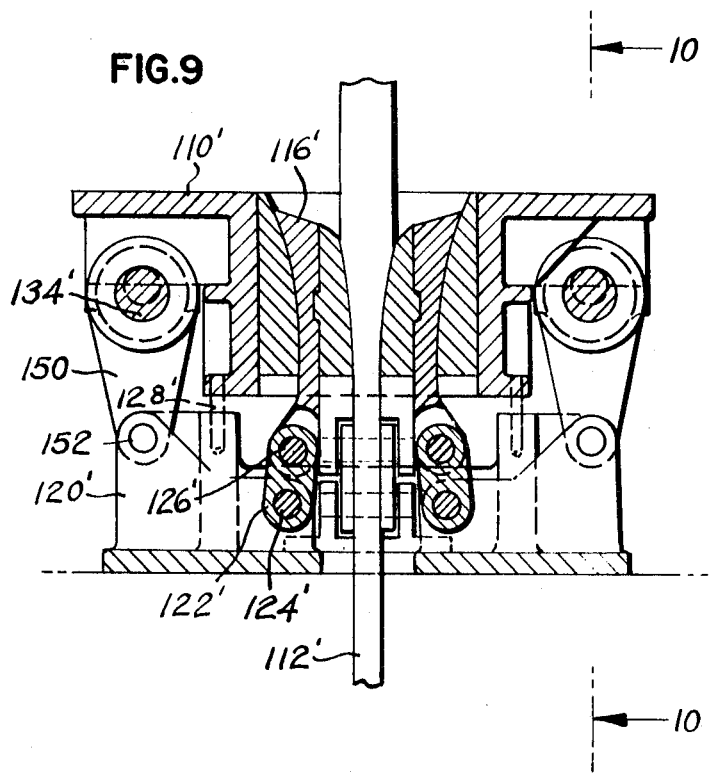
FIG. 9 is a sectional view showing another modification.

The further modified embodiment of the invention shown in FIGS. 9 and 10 is similar to that in FIGS. 6–8 wherein corresponding parts have been identified by corresponding numerals with a prime (') added in FIGS. 9–10. However, in FIGS. 9–10 the table 120' is reciprocated by the eccentrics 134' provided on the drive shafts 130' which are journalled in bearings 132' in the frame 110' itself, the table 120' being suspended below the frame 110' and reciprocated by the eccentrics 134' through the medium of connecting rods 150 which engage the eccentrics and are pivoted to the table 120' as at 152.

FIGS. 11–14 illustrate various shapes and arrangements of the work engaging shoes which may be used in the apparatus of the invention. For example, in FIG. 11 the four shoes are arranged in a square formation with two opposing shoes 28a disposed between and overlapped by two other opposing shoes 28b. When fully lowered, the four shoes come into contact with each other and the overlap prevents any overflow of the work material into spaces between the shoes, as compression of the material occurs. This arrangement also permits adjustment of the shoes 28a closer together or further apart while the spacing of the shoes 28b remains the same, whereby the resultant cross-section of the work may be longer in one direction than in the other, rather than being square.

Figure 12:
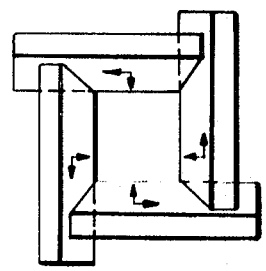
Figure 13:
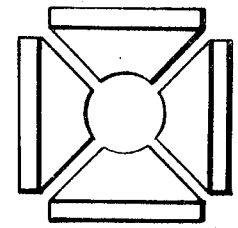
Figure 14:
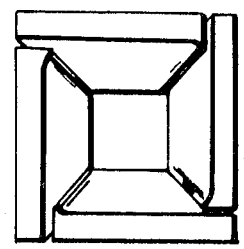

A similar arrangement is also possible in FIG. 12 wherein each shoe is contacted by an end of an adjacent shoe, as it is in FIG. 14 where the contacting end portion of each shoe is inwardly curved so as to provide rounded corners on the finished work. FIG. 13 shows a shoe arrangement for producing work of a circular cross-section. It will be also understood that if work in a flat strip form is to be produced, the apparatus may utilize only one pair of opposing shoes instead of two pairs, as disclosed herein.

Although the apparatus has been shown and described with reference to downward vertical movement of the work, manifestly it may also be used with the work moving in a horizontal or any other suitable direction.

What is claimed as new is:

1. In an apparatus for cross-sectionally reducing and shaping slender work which is movable in a direction longitudinally of itself, the combination of a perimetric frame adapted for movement of work therethrough, at least one pair of opposing guide surfaces provided in said frame, said guide surfaces being convergent longitudinally in the direction of movement of the work, at least one pair of work engaging shoes slidable longitudinally on the respective guide surfaces, and actuating means on said frame for sliding said shoes along the convergent guide surfaces whereby to alternately increase and decrease the force exerted by the shoes on the work.

2. The apparatus as defined in claim 1 wherein said guide surfaces are convex and wherein said shoes have convex work engaging faces concentric with the convex guide surfaces, the axes of convexity of the guide surfaces and shoe faces being disposed in a common plane transverse to the direction of movement of the work.

3. The apparatus as defined in claim 1 wherein said guide surfaces are flat and wherein said shoes have flat work engaging faces parallel to the flat guide surfaces.

4. The apparatus as defined in claim 1 together with opposing blocks mounted in said frame, said guide surfaces being provided on said blocks.

5. The apparatus as defined in claim 1 together with second actuating means for moving said shoes transversely into and out of engagement with the work independently of sliding of the shoes by the first mentioned actuating means.

6. The apparatus as defined in claim 1 together with opposing blocks positioned in said frame, said guide surfaces being provided on said blocks, and second actuating means for moving said shoes transversely into and out of engagement with the work independently of sliding of the shoes by the first mentioned actuating means, said second actuating means comprising wedges slidably interposed between said frame and said blocks, and means for sliding said wedges.

7. The apparatus as defined in claim 1 wherein said actuating means include levers pivoted to said frame and operatively connected to said shoes, and means for actuating said levers.

8. The apparatus as defined in claim 1 wherein said actuating means include a work surrounding table juxtaposed longitudinally to said frame and reciprocable longitudinally relative to the frame, linkage connecting said shoes to said table, and means for reciprocating the table.

9. The apparatus as defined in claim 1 wherein said shoes have work engaging faces with leading and trailing ends relative to direction of movement of the work, the leading end portions of said faces having a higher coefficient of friction than the trailing end portions thereof.

10. In an apparatus for cross-sectionally reducing and shaping slender work while said work is being moved in a direction longitudinally of itself, two pairs of work-engaging shoes, each shoe of each pair having a work-engaging face opposite the work-engaging face of the other shoe of the pair and an end face, said work-engaging faces being ararnged at right angles and defining therebetween a work passage of decreasing cross section in said direction, said end face of each shoe of one pair being complemental to and engaging the work-engaging face of an adjacent shoe of the other pair adjacent a portion of said passage closed by said work-engaging faces in all transverse directions, the end faces of each shoe of the other pair being complemental to and engaging the work-engaging faces of an adjacent shoe and said one pair adjacent said portion of said passage.

References Cited
UNITED STATES PATENTS

| | | | |
|---|---|---|---|
| 444,547 | 1/1891 | Samuels | 72—402 |
| 685,417 | 10/1901 | Williams | 72—189 |
| 2,999,405 | 9/1961 | Ewart | 72—402 |

LOWELL A. LARSON, Primary Examiner

U.S. Cl. X.R.

72—189, 407

UNITED STATES PATENT OFFICE
CERTIFICATE OF CORRECTION

Patent No. 3,626,746  Dated December 14, 1971

Inventor(s) Joseph Pietryka

It is certified that error appears in the above-identified patent and that said Letters Patent are hereby corrected as shown below:

In the heading to the printed specification, after line 5, insert -- Claims priority, application France, February 26, 1968, 141,176; July 12, 1968, 159,016 --.

Signed and sealed this 9th day of May 1972.

(SEAL)
Attest:

EDWARD M. FLETCHER, JR.　　　　　　　ROBERT GOTTSCHALK
Attesting Officer　　　　　　　　　　Commissioner of Patents